(12) United States Patent
Zorn et al.

(10) Patent No.: US 12,524,616 B2
(45) Date of Patent: Jan. 13, 2026

(54) GENERATION OF INTERACTIVE UTTERANCES OF CODE TASKS

(71) Applicant: Microsoft Technology Licensing, LLC, Redmond, WA (US)

(72) Inventors: Benjamin Goth Zorn, Woodinville, WA (US); Carina Suzana Negreanu, Cambridge (GB); Advait Sarkar, Cambridge (GB); Andrew Donald Gordon, Cambridge (GB); John Herbert Martin Williams, Sheffield (GB); Xieyang Liu, Pittsburgh, PA (US); Neil Blunt Toronto, Cambridge (GB); Sruti Srinivasa Ragavan, Oxford (GB); Brian Paul Slininger, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 277 days.

(21) Appl. No.: 17/976,570

(22) Filed: Oct. 28, 2022

(65) Prior Publication Data
US 2024/0143928 A1  May 2, 2024

(51) Int. Cl.
*G06F 40/30* (2020.01)
*G06F 40/166* (2020.01)
*G06F 40/40* (2020.01)

(52) U.S. Cl.
CPC ............ *G06F 40/30* (2020.01); *G06F 40/166* (2020.01); *G06F 40/40* (2020.01)

(58) Field of Classification Search
None
See application file for complete search history.

(56) References Cited

U.S. PATENT DOCUMENTS

2003/0163323 A1\* 8/2003 Bluvband ................. G06F 8/73
                                    704/E15.045
2023/0376841 A1\* 11/2023 Le ........................... G06N 3/092

FOREIGN PATENT DOCUMENTS

WO      2021144904 A1    7/2021

OTHER PUBLICATIONS

Aghamohammadi, et al., "Generating summaries for methods of event-driven programs: An Android case study," Journal of Systems & Software, vol. 170, 16 Pages, Dec. 1, 2020.

(Continued)

*Primary Examiner* — Quynh H Nguyen
(74) *Attorney, Agent, or Firm* — Workman Nydegger (57) ABSTRACT

The automated generation of a natural language explanation of what code does. The code is structured to perform tasks because the code itself semantically specifies that those tasks are to be performed. A task-centric representation of the code is automatically generated that includes a task representation of each of some or all of the tasks to be performed as specified by the code. Natural language utterances are then automatically generated by generating a corresponding natural language utterance that semantically describes in natural language the corresponding task represented by the corresponding task representation. Controls are rendered for each natural language utterance that each permit a user to edit the corresponding natural language utterance. After editing, the code itself may be automatically modified or regenerated to reflect the changed natural language utterances.

20 Claims, 8 Drawing Sheets

(56) References Cited

OTHER PUBLICATIONS

Chen, et al., "Evaluating large language models trained on code," arXiv, Cornell University, 35 pages, Jul. 14, 2021.
International Search Report and Written Opinion received for PCT Application No. PCT/US2023/033421, Jan. 15, 2024, 13 pages.
OpenAI, "Creating a Space Game with OpenAI Codex," accessed on URL: https://www.youtube.com/watch?v=Zm9B-DvwOgw&t=109s, retrieved on Jan. 3, 2024, 2 Pages, Aug. 10, 2021.
"Application as Filed in U.S. Appl. No. 17/849,056", filed Jun. 24, 2022, 40 Pages.
International Preliminary Report on Patentability (Chapter 1) received for PCT Application No. PCT/US23/033421, May 8, 2025, 07 pages.

* cited by examiner

```
df['Mission Length']
 = df['Space Flight (hr)'] /
   df['Missions'].str.count('STS')
```

Generated Python code

| Name | Space Flight (hr) | Missions | Mission Length |
|---|---|---|---|
| Joseph Acaba | 3307 | STS-119 (Discovery), ISS-31/32 (Soyuz) | 3307 |
| Buzz Aldrin | 289 | Gemini 12, Apollo 11 | |
| Andrew Allen | 906 | STS-46 (Atlantis), STS-62 (Columbia), STS-75 (Columbia) | 302 |
| Neil Armstrong | 205 | Gemini 8, Apollo 11 | |
| Richard Arnold | 307 | STS-119 (Discovery) | 307 |

GENERATION OF INTERACTIVE UTTERANCES OF CODE TASKS

BACKGROUND

Conventional large language models are deep neural networks that have on the order of billions (and fast approaching trillions) of parameters that may each be adjusted as the model is trained on textual training data. Such large language models are trained on large repositories of sequential text such as natural language text and/or imperative code. As an example, large language models can be trained on libraries of text collections, code files, or other sources of sequential text. Accordingly, such large language models can perform some tasks on a linear string of input text (also called a "prompt"). Large language models are sophisticated and can be very expensive to create, and thus the large language models are often provided in the form of a cloud service. Examples of large language models include GPT-3®, AlphaCode, and PaLM.

As an example, some conventional large language models can receive natural language text and generate an appropriate response. Thus, large language models are used to allow artificial intelligence to have a conversation with a human. As another example, some conventional large language models can generate imperative code using a prompt in the form of a natural language description of what the imperative code should be able to do. Such conventional large language models are thus adept at generating a linear sequence of output text based on a linear sequence of input text, such as natural language or imperative code.

Given a particular intent of a user, there is a particular scope of natural language that the large language model will be capable of properly interpreting to accomplish the user's intent. Thus, some natural language expressions may result in effective utilization of the large language model, while other natural language expressions may not be as effectively interpreted by the large language model, and some natural language expressions may result in no output from the large language model at all.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the automated generation of a natural language explanation of what code does. The code is structured to, if executed, cause performance of multiple tasks because the code itself semantically specifies that those tasks are to be performed. Then, a task-centric representation of the code is automatically generated that includes a task representation of each of at least some of the multiple tasks to be performed as specified by the code. Natural language utterances are then automatically generated by, for each of at least some of the multiple task representations, generating a corresponding natural language utterance that semantically describes in natural language the corresponding task represented by the corresponding task representation. Controls are rendered for each of at least some of those natural language utterances that permit a user to edit the natural language utterance. After editing, the code itself may be automatically modified or regenerated to reflect the changed natural language utterances.

The natural language explanation is founded upon the task-centric representation, and thus the natural language explanation explains the tasks in terms of what the code actually does. Thus, by modifying the natural language utterances of the natural language explanation, the code itself may be more directly and effectively modified. For instance, suppose that the code is generated by a language model. The natural language utterances in that case not only describe what the code actually does in a task-centric way, but the natural language utterances provide a user with a natural language explanation using the language space that is more familiar to the language model. Thus, by interacting with the natural language utterances, the user will become more familiar with the language space that makes most effective use of the language model.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and details through the use of the accompanying drawings in which.

DETAILED DESCRIPTION

The principles described herein relate to the automated generation of a natural language explanation of what code does. The code is structured to, if executed, cause performance of multiple tasks because the code itself semantically specifies that those tasks are to be performed. Then, a task-centric representation of the code is automatically generated that includes a task representation of each of at least some of the multiple tasks to be performed as specified by the code. Natural language utterances are then automatically generated by, for each of at least some of the multiple task representations, generating a corresponding natural language utterance that semantically describes in natural language the corresponding task represented by the corresponding task representation. Controls are rendered for each of at least some of those natural language utterances that permit a user to edit the natural language utterance. After editing, the code itself may be automatically modified or regenerated to reflect the changed natural language utterances.

The natural language explanation is founded upon the task-centric representation, and thus the natural language explanation explains the tasks in terms of what the code actually does. Thus, by modifying the natural language utterances of the natural language explanation, the code itself may be more directly and effectively modified. For instance, suppose that the code is generated by a language model. The natural language utterances in that case not only describe what the code actually does in a task-centric way, but the natural language utterances provide a user with a natural language explanation using the language space that is more familiar to the language model. Thus, by interacting with the natural language utterances, the user will become more familiar with the language space that makes most effective use of the language model.

Figure 1:
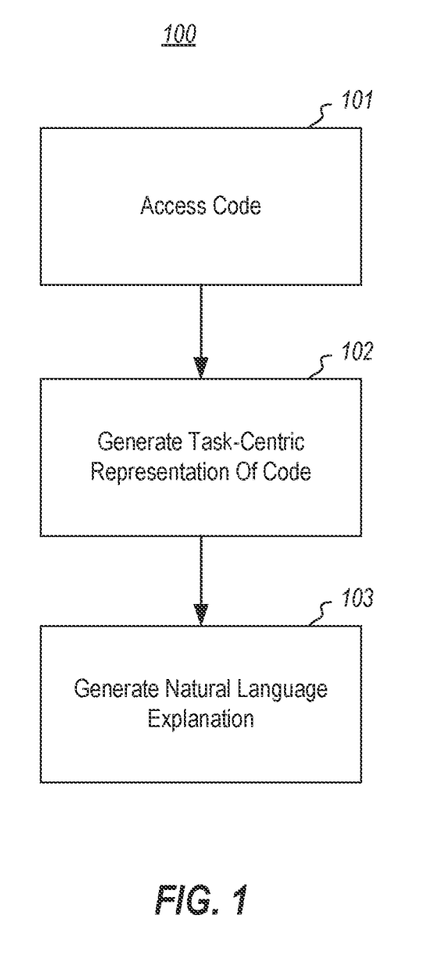
FIG. 1 illustrates a flowchart of a method for generating a natural language explanation of what code does, in accordance with the principles described herein.
Figure 2:
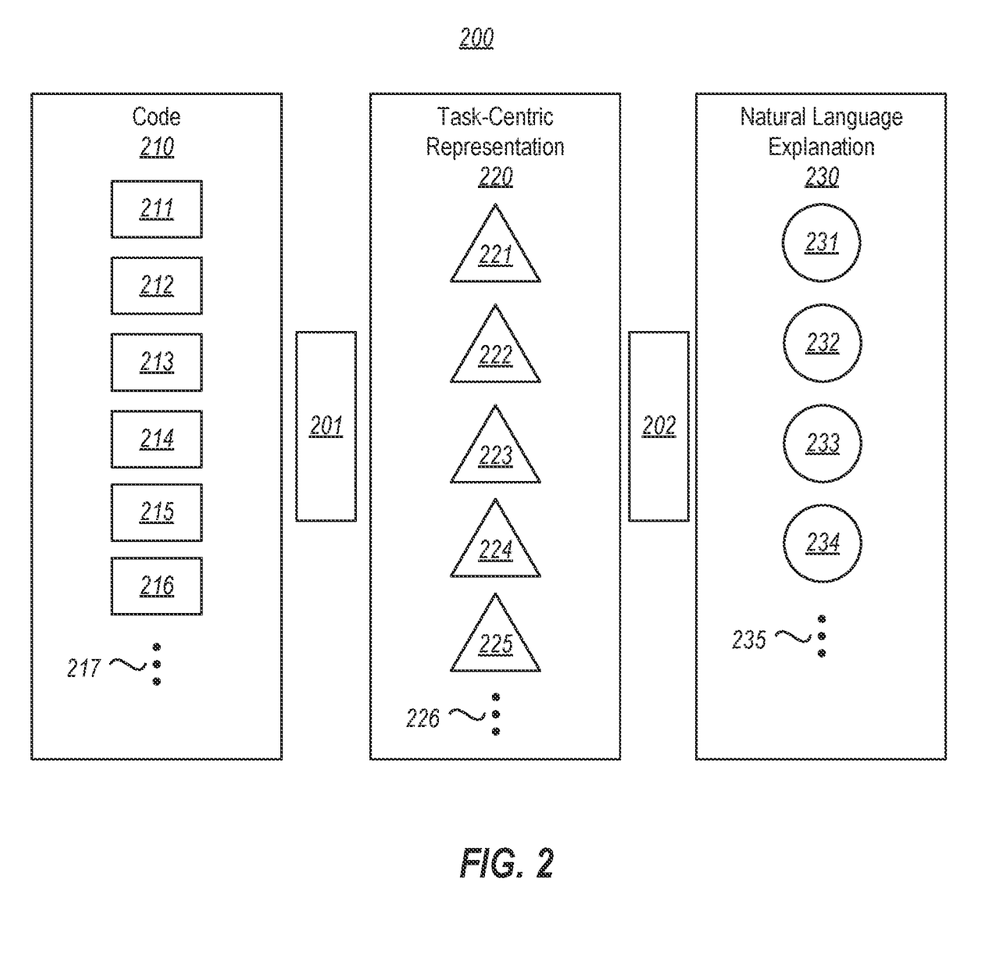
FIG. 2 illustrates an example dataflow in which a natural language explanation of what code does is performed.

FIG. 1 illustrates a flowchart of a method 100 for generating a natural language explanation of what code does. FIG. 2 illustrates an example dataflow 200 in which a natural language explanation 230 of what code 210 does is performed. The method 100 of FIG. 1 may be performed to accomplish the dataflow 200 of FIG. 2. Accordingly, the method 100 of FIG. 1 will be hereafter described with respect to both FIGS. 1 and 2.

The method 100 includes accessing the code that is structured to, if executed, cause performance of multiple tasks (act 101). For example, in the dataflow 200 of FIG. 2, the executable component 201 accesses code 210. In one embodiment, the method 100 may be performed by a computing system such as the computing system 700 of FIG. 7. Accordingly, the executable component 201 may be structured as described below for the executable component 706 of FIG. 7.

The accessed code is structured to, if executed by a computing system, cause the computing system to perform multiple tasks. As an example, in FIG. 2, the accessed code 210 is structured such that, if executed, the code 210 causes the performance of six tasks 211 through 216. However, the ellipsis 217 represents that the code 210 may be executed to perform any number of tasks from as few as one, to potentially numerous tasks. The ellipsis 217 also represents that the principles described herein are not limited to any particular sequence in which the tasks are performed. For instance, the tasks 211 through 216 may be performed in sequence one after the other. Alternatively, some of the tasks may be performed in parallel.

The code 210 may itself define both the tasks to be performed as well as the dependencies between the tasks. The principles described herein are not limited to precisely what tasks the code is structured to perform and what those dependencies are. Nonetheless, whatever those tasks and dependencies are, the principles described herein facilitate the generation of a natural language explanation of what those tasks are.

Referring back to FIG. 1, the method 100 then includes generating a task-centric representation of the code (act 102). The task-centric representation includes a task representation of each of at least some of the tasks that the code is structured to perform. Accordingly, the task-centric representation includes multiple task representations.

Referring to the example dataflow 200 of FIG. 2, the task-centric representation 220 is illustrated as including five task representations 221 through 225, each represented as a triangle. The task representation 221 represents the task 211 of the code 210, the task representation 222 represents the task 212 of the code 210, the task representation 223 represents the task 213 of the code 210, the task representation 224 represents the task 214 of the code 210, and the task representation 225 represents the task 225 of the code 210.

The ellipsis 226 represents that there is no limit to the number of task representations in the task-centric representation. There may be as few as one task representation or potentially numerous task representations. Nevertheless, each task representation represents a corresponding task of the code.

Furthermore, in the example of FIG. 2, there is a one-to-one mapping between the task representation in the task-centric representation and a corresponding task that is performed by the code (if executed). However, where the code semantically expresses tasks at a lower level), the task representation may represent multiple of the lower level tasks, to thereby generate a task representation that is at a level that is more easily understood by a user. For example, the excel formula '=LEFT(A2, FIND("-", "A2")–1) could would map into a single task of "text before-". Conversely, if the code is very high level, or uses features not supported in the task representation token library, then the single code task may be represented by multiple components in TCR. Thus, when it is stated herein that the task-centric representation includes a task representation of each of at least some of the plurality of tasks of the code, the statement embodiments one-to-one mappings between the code task and the task representation, multiple-to-one mappings between the code task and the task representation, one-to multiple mappings between the code task and the task representation, and combinations thereof.

While all tasks that would be performed by the code (if executed) may have a corresponding task representation (whether mapped one-to-one, multiple-to-one, or one-to-multiple), that is not required. For instance, there may be some tasks that would be performed by the code that are more artifactual in nature, and do not really go to the core of what the code would actually do. As an example, in FIG. 2, the task 216 has no corresponding task representation. Thus, the act 202 includes generating a task-centric representation that includes a task representation of each of at least some (potentially all, but potentially less than all) of the plurality of tasks.

Returning to FIG. 1, the method 100 then includes generating a natural language explanation that includes multiple natural language utterances (act 103). Each of these natural language utterances corresponds to at least one of the task-centric representations. Referring to FIG. 2, an executable component 202 generates the natural language explanation 230 from the task-centric representation 220. In one embodiment, the method 100 may be performed by a computing system such as the computing system 700 of FIG. 7. Accordingly, the executable component 202 may be structured as described below for the executable component 706 of FIG. 7.

Referring to the example dataflow 200 of FIG. 2, the natural language expression 230 is illustrated as including four natural language utterances 231 through 234, each represented as a circle. The natural language utterance 231 is generated from the task representation 221, and is thus a natural language description of the task 211. The natural language utterance 232 is generated from the task representation 222, and is thus a natural language description of the task 212. The natural language utterance 233 is generated from the task representation 223, and is thus a natural language description of the task 213. Finally, the natural language utterance 234 is generated from the task representation 224, and is thus a natural language description of the task 214.

The ellipsis 235 represents that there is no limit to the number of natural language utterances in the natural language explanation. There may be as few as one natural language utterance or potentially numerous natural language utterances. Nevertheless, each natural language utterance is generated from a corresponding task representation and describes a corresponding task that would be performed by the code (if executed).

Furthermore, in the example of FIG. 2, there is a one-to-one mapping between the task representation in the task-centric representation a natural language utterance in the natural language explanation. However, there could be a multiple-to-one mapping, or a one-to-multiple mapping between task representations and natural language utterances. This allows for the accommodation of different levels of granularity between the representation space of the tasks and the natural language space used by the user.

While all task representations may have a corresponding natural language utterance in the natural language description (whether mapped one-to-one, multiple-to-one, or one-to-multiple), that is not required. As an example, in FIG. 2, the task representation 225 has no corresponding natural language utterance. Thus, the act 103 includes generating a natural language explanation that includes a natural language utterance corresponding to each of at least some (potentially all, but potentially less than all) of the task representations of the task-centric explanation.

The natural language expression of what the code does is a specific type of natural language expression that is grounded on the details of what the code is programmed to do. It may be language-independent and constructed from a set of action tokens that represent actions that are independent or largely independent of the code language in which the action is expressed. Likewise, the data input to the task and the data output from the task may also be expressed by data tokens that represent data in a way that is independent of or largely independent of the code language in which the data is expressed.

Furthermore, the task-centric explanation is represented such that a natural language utterance can be easily generated in whatever natural language is familiar to the user. That natural language may be a particular language (e.g., English, Japanese, French, German, etc.), a particular dialect, and/or a particular tone or level of formality. Referring to FIG. 2, the executable component 201 thus provides a task-centric representation that represents what the code would actually do if executed, whilst the executable component 202 generates the natural language explanation that explains in natural language what the code would actually do. Thus, the task-centric representation retains the details of what the code is programmed to do.

In addition, the task-centric representation may reduce ambiguity introduced by the concrete code representation. For instance, consider the following Python code df['Missions'].str.count('STS'). Generally stated, this code would count occurrences of 'STS' in a 'Missions' column. The presence of attribute .str is an artifact of the Pandas library, which is meaningless to a user with no Python expertise. Further, consider the Python code df['Missions'].str[0], which extracts the first character from the 'Missions' column. There are two syntactic access expressions of the form expr1[expr2] with different meanings; the first represents column projection and the second represents string indexing. A purely syntax-driven utterance will fail to reflect these different meanings.

Thus, in some embodiments, the task-centric representation is constructed using a type-directed translation from the abstract syntax tree. The types help to resolve identifiers, such as "count", to symbols (i.e., data tokens). There may then be an associated natural language utterance that is mapped to each symbol. Types are also used to enrich utterances. For example, a phrase's first letter or first word, rather than first element, can be selected depending on the type of expr1 in expr1[0].

The natural language utterance corresponding to a task representation may be derived through a traversal of a task representation, a process which will be referred to herein as "layout". When a task representation has a single subject, the operation is presented as an instruction and as a layout of the subject as additional instructions. For example, the Python code df['Missions'].str.count('STS') is a linear chain of operations, each with a single subject, and is therefore presented as a sequence of instructions: (1) select column "Missions", (2) calculate count "STS". In contrast, the code df['Space Flight (hr)']/df['Missions'].str.count(STS) is rooted with a binary operator, and is therefore presented as a single descriptive instruction: (1) column "Space Flight (hr)" divided by count "STS" from column "Missions". The layout process can combine the instructional and descriptive styles, and therefore, the resulting utterance for example code is: (1) create column "Mission Length", (2) column "Space Flight (hr)" divided by count "STS" from column "Missions".

Since the natural language expression includes natural language utterances that map to tasks performed by the code, user modifications of those natural language utterance may also be more easily used to actually modify that code. For instance, a user could delete, edit, or add a natural language utterance to the natural language expression. Then, the resulting code could be automatically modified by, for example, programmatically directly editing the code, using program synthesis to modify the code, or providing the edited natural language explanation to a language model to cause the language model to output different code.

Figure 3:
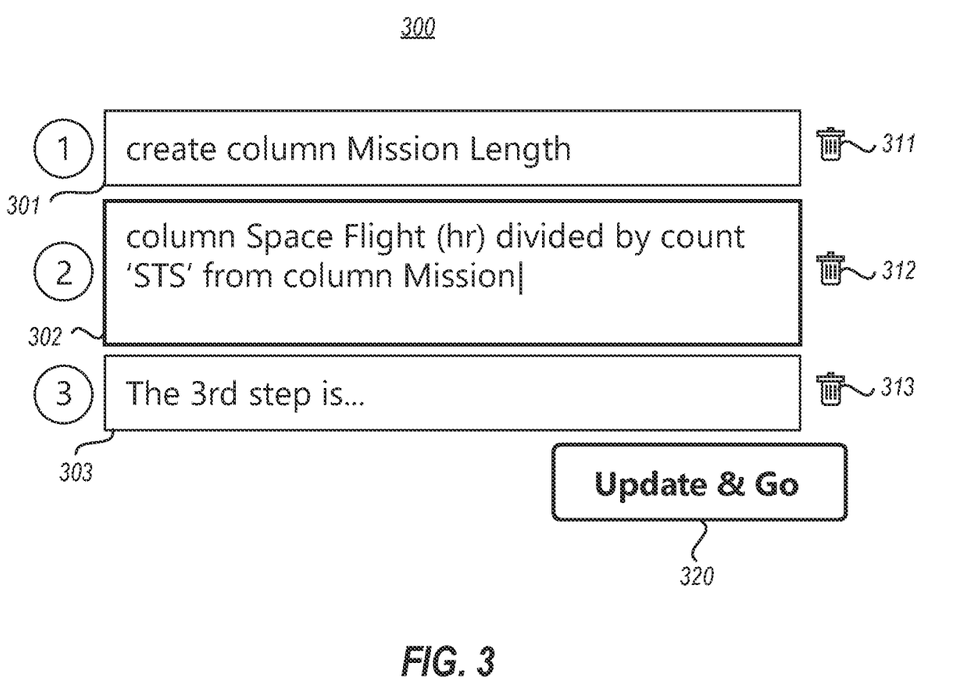
FIG. 3 illustrates a user interface that could be presented to a user after generating the natural language explanation, and which allows a user to edit the natural language explanation and cause the code to be automatically edited and/or regenerated in response to the editing of the natural language explanation.

For example, FIG. 3 illustrates a user interface 300 that could be presented to a user after generating the natural language explanation. In this example, the natural language explanation includes two natural language utterances including 1) "create column Mission length" and 2) "column Space Flight (hr) divided by count "STS" from column Missions". The first natural language utterance is within text box 301, and the second natural language utterance is within text box 302. The user may edit each natural language utterance by selecting within the respective text box 301 or 302 and modifying the natural language utterance. The user may add a natural language utterance by editing within a third text box 303 (which is an example of an addition control). A user may delete a natural language utterance by selecting icons 311 through 313 next to the respective text box 301 through 303 containing the natural language utterance to be deleted. A user may also reorder the natural language utterances by dragging the text box to the appropriate order within the sequence of text boxes. Each of the text boxes 301 through 303 and associated icons 311 through 313 may thus be consider an example of an editing control that allows for user editing of the corresponding natural language utterance.

Figure 4:
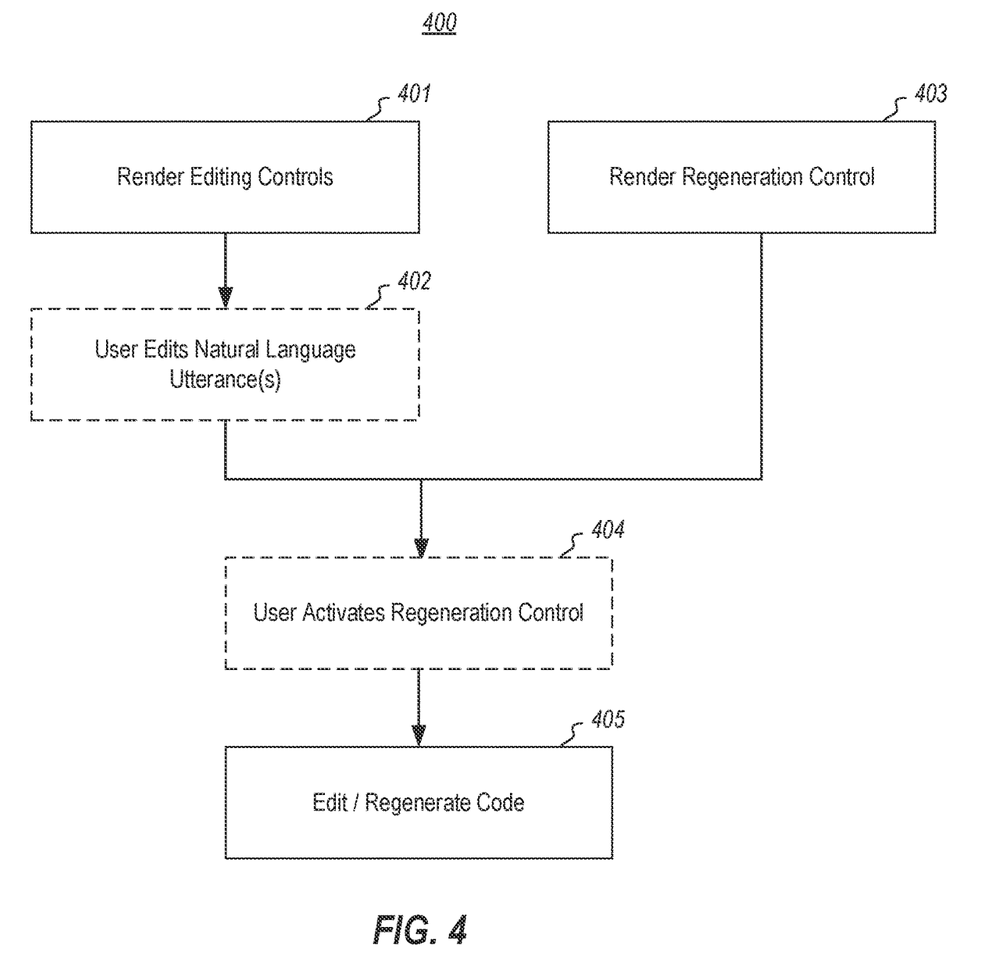
FIG. 4 illustrates a flowchart of a method for causing the code to be edited or regenerated, in accordance with the principles described herein.

The user interface 300 also includes a regeneration control 320 that is structured to initiate regeneration of the code in response to one of more of the plurality of editing controls being interacted with. Thus, once the natural language utterances of the user interface 300 have been edited as desired by the user, the user may select the regeneration control 320 to cause the code to be edited or regenerated. FIG. 4 illustrates a flowchart of a method 400 for causing the code to be edited or regenerated, in accordance with the principles described herein. The method 400 may be performed in the context of a user interface, an example of which is the user interface 300 of FIG. 3. Accordingly, the method 400 of FIG. 4 will now be described with respect to the user interface 300 of FIG. 3.

The method 400 includes causing a plurality of natural language utterance editing controls to be rendered (act 401) by, for each of at least some of the natural language utterances, causing a corresponding control to be rendered that is structured to allow user-editing of the corresponding natural language utterance. The user may thereafter edit the natural language utterance(s) of the natural language explanation (act 402). For instance, the user interface 300 is rendered to include the editing controls 301, 302 and 303, which the user may use to edit the natural language utterances.

In addition, the method includes causing a code regeneration control to be rendered (act 403) that is structured to initiate regeneration of the code in response to one or more of the plurality of controls being interacted with to edit one or more of the plurality of natural language utterances. When the user is ready to have the code edited or regenerated based on the user edits of act 402, the user activates the regeneration control (act 404), causing the code to be edited or regenerated (act 405). Acts performed by the user (e.g., acts 402 and 404) are illustrated in FIG. 4 using dashed-lined boxes. That said, generation of the code may be performed without the use of a regeneration control. For instance, regeneration may be initiated in response to an event, such as perhaps the user finishes editing the natural language utterance(s), or perhaps the event is from an external source (such as a language model asynchronously determines a better solution).

Thus, the principles described herein may facilitate a user modifying code using natural language and without requiring the user have any particular knowledge of the underlying code or programming language in which the code is expressed. For instance, the user was presented with natural language utterances expressing what the code would actually do (if executed), and if the user was not satisfied with what the code would do, may edit that code by only editing the natural language explanation to more closely align with what the user intends the code to do.

Thus, the task-centric representation allows for natural language editing of the code, where the editing may more easily be used to automatically edit or regenerate the underlying code. In some cases, the code was generated by a language model, such as a language model based on an earlier natural language utterance input into the language model. In that case, the principles described herein have an additional benefit. That is, the natural language explanation represents an expression that aligns more closely with the language space that the language model understands. Thus, by interacting with the natural language utterances, the user becomes more and more familiar with how to generate natural language instructions to the language model for generation of code in the future. Thus, the principles described herein permit the user to learn how to use natural language in a way that is most easily understood by the language model, and thus make more effective use of the language model.

Figure 5:
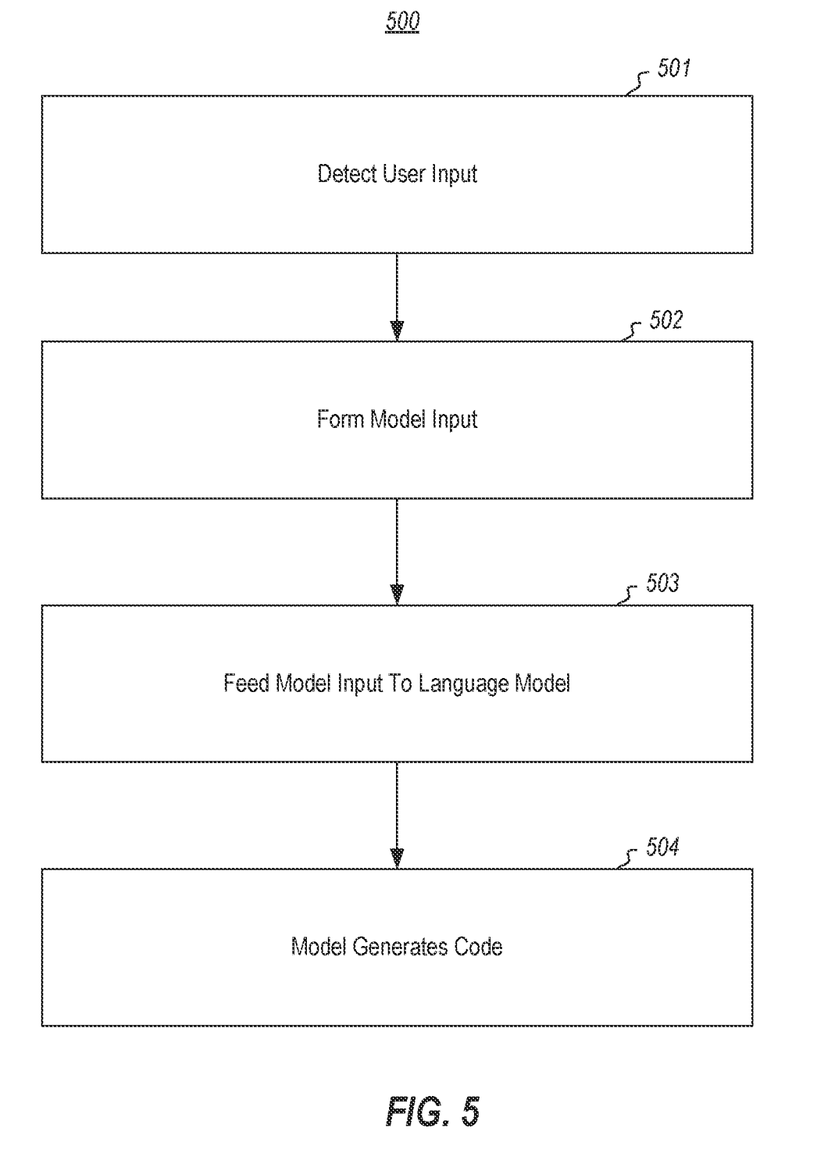
FIG. 5 illustrates a flowchart of a method for generating code using a language model, from which code the natural language explanation is generated.

FIG. 5 illustrates a flowchart of a method 500 for generating the code in the first place using a language model. First, the computing system detects user intent to generate code (act 501). This user intent is then used to construct model input (act 502). That model input could include a natural language description of the user intent. The model input could also potentially include non-natural language data, such as perhaps user data (e.g., a spreadsheet). The model input is fed to the language model (act 503) causing the language model to generate the code (act 504). Then, the method 100 of FIG. 1 may be performed on that code to show the user a task-centric way of how the language model understood the user's intent, and further giving the user the opportunity to amend the code to more closely align with the user's intent.

The language model's effectiveness in generating the code that aligns with the user intent depends on how closely the user's natural language expression aligns with the language space understood by the language model. However, if the user has experience interfacing with the natural language explanation of code previously generated by the same language model, over time the user will have become more familiar with what the language model tends to understand. In short, the user will have learned to more closely speak the language model's language. Accordingly, it is more likely that such users will provide natural language input (in act 501) that causes the language model to generate code (in act 504) that more closely represents the user intent. In any case, the user can test the understanding of the language model by seeing what the code actually does in natural language, and make appropriate adjustments to that code, again using only natural language.

Accordingly, the principles described herein provide a powerful mechanism for users to understand and potentially modify code using natural language, opening up coding to a wider segment of the population. Furthermore, the principles described herein allow for a user to become more familiar with the language space of a language model, and thereby become more able to effectively use the language space of a language model.

Figure 6A:
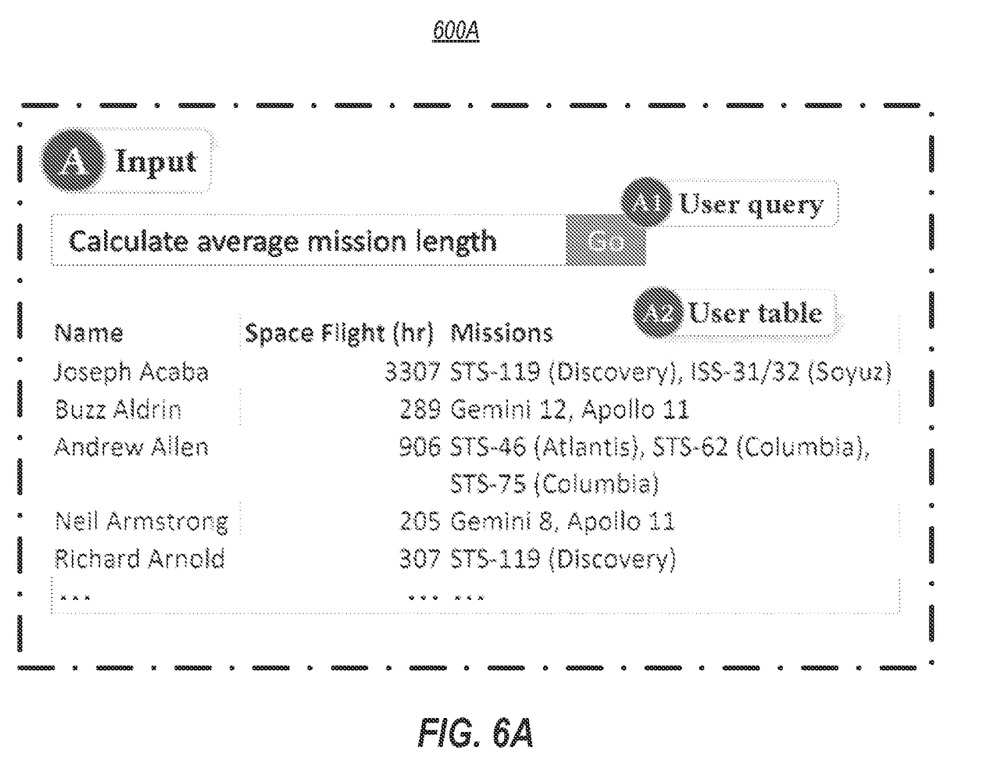
FIG. 6A illustrates an example user interface in which the user expresses a user intent in the form of a natural language input, as well as the non-natural language astronaut spreadsheet table.

A particular example will now be provided. In this example, the user has a dataset listing astronauts, the total time each astronaut spent in space, and a comma-separated list of missions. The task the user wants to perform is to calculate each astronaut's average mission duration in hours. To begin with, suppose the user enters the natural language query "calculate average mission length". FIG. 6A illustrates an example user interface 600A in which the user provides this natural language input (see A1), as well as the non-natural language astronaut spreadsheet table (see A2).

Figure 6B:
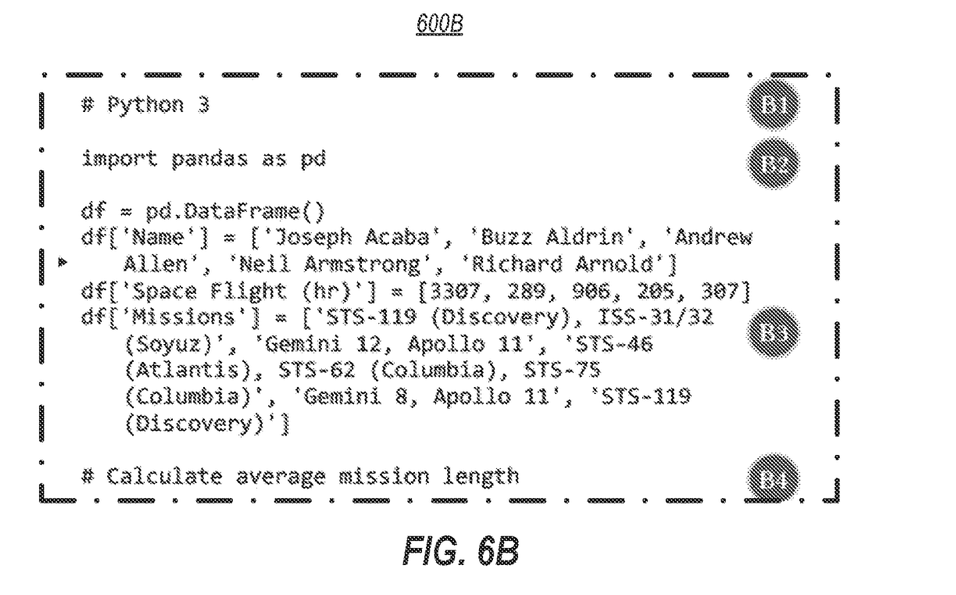
FIG. 6B illustrates an example of the prompt, which is a Python code representation of the input of FIG. 6A.

This input is then converted into a prompt in the form of sequential text. FIG. 6B illustrates an example of the prompt 600B, which is a Python code representation of the input. Here, the target language (Python 3) (see B1) and libraries (see B2) are specified. The spreadsheet table is converted to a Pandas dataframe (see B3). Finally, the user query is appended as a comment "Calculate average mission length" (see B4).

Figure 6C:
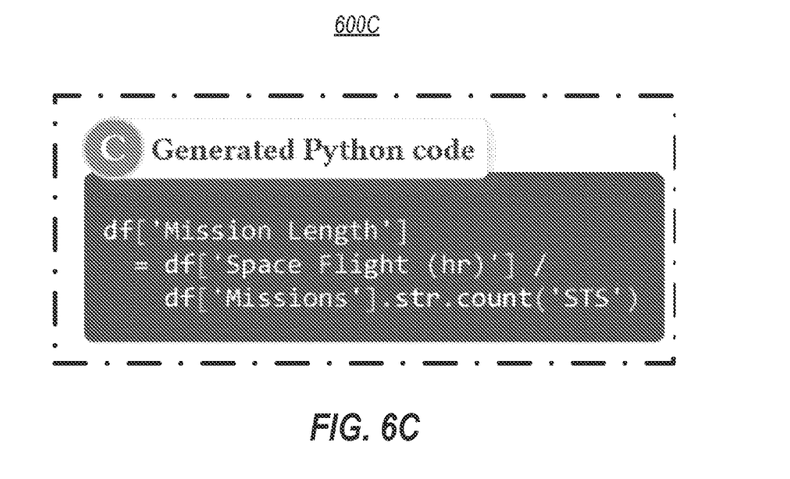
FIG. 6C illustrates example code that may be generated from the example prompt of FIG. 6B.

This input is then fed to the language model, which, after post-processing, generates the code such as the code 600C shown in FIG. 6C. Here, the OpenAI Codex API is called with the prompt 600B of FIG. 6C and with certain hyperparameters. In particular, the temperature is set to 0 (to minimize variability), and the stop sequence is set to "\n #" (i.e., at the start of a Python comment), as Codex may delimit self-contained solutions using Python comments. The API is called until a valid snippet is generated. In this example, the code 600C of FIG. 6C may be generated. That said, the principles described herein are not limited to the use of any particular language model, or even to the use of a language model at all.

Figure 6D:
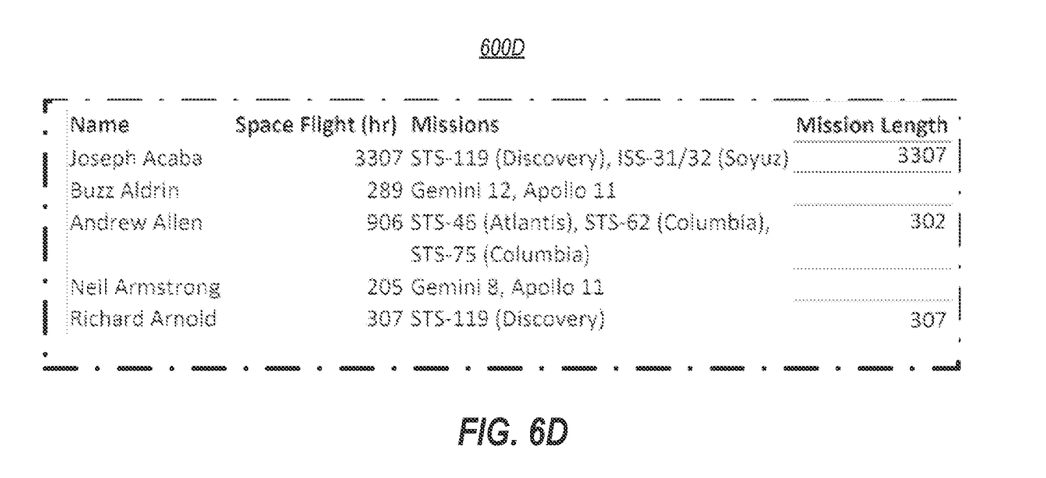
FIG. 6D shows an extra column added by writing the output from the code of FIG. 6C into a spreadsheet grid.

The generated code is then run in a JavaScript web serve sandbox using Pyodide, a Python distribution for WebAssembly. FIG. 6D shows modified table 600D having an extra column added by writing the output from the code of FIG. 6C into a spreadsheet grid. If the completion's output is a new column or row, it may be appended to the user's table. If the output is a single value or a new table, the value or table may be shown in a side-pane. The user need not be shown the code of FIG. 6C.

However, a natural language explanation of the code of FIG. 6C is also generated, as shown in the user interface of FIG. 3. Recall that this user interface allows the user to see a task-centric natural language explanation of what the code generated by the language model does. If this is not what the user wants to have done, the user may edit the natural language utterances in FIG. 3. From this the user can see that the language model invented a faulty heuristic for counting the number of missions (the denominator in the average duration of missions) by counting the number of occurrences of the word "STS" from the "Missions" column and adding 1. After editing the second step with the new logic, new natural language input is provided that more closely aligns with the user intent. For instance, the user may determine that step 1 of FIG. 3 is fine, but that step 2 is wrong. As an example, the user might edit the text box 302 to read "column Space Flight (hr) divided by count ',' from column Missions+1. Here, the user corrected the calculation of the number of missions by telling the model to count the number of commas in the "Missions" column and adding 1.

Because the principles described herein are performed in the context of a computing system, some introductory discussion of a computing system will be described with respect to FIG. 7. Computing systems are now increasingly taking a wide variety of forms. Computing systems may, for example, be handheld devices, appliances, laptop computers, desktop computers, mainframes, distributed computing systems, data centers, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 7:
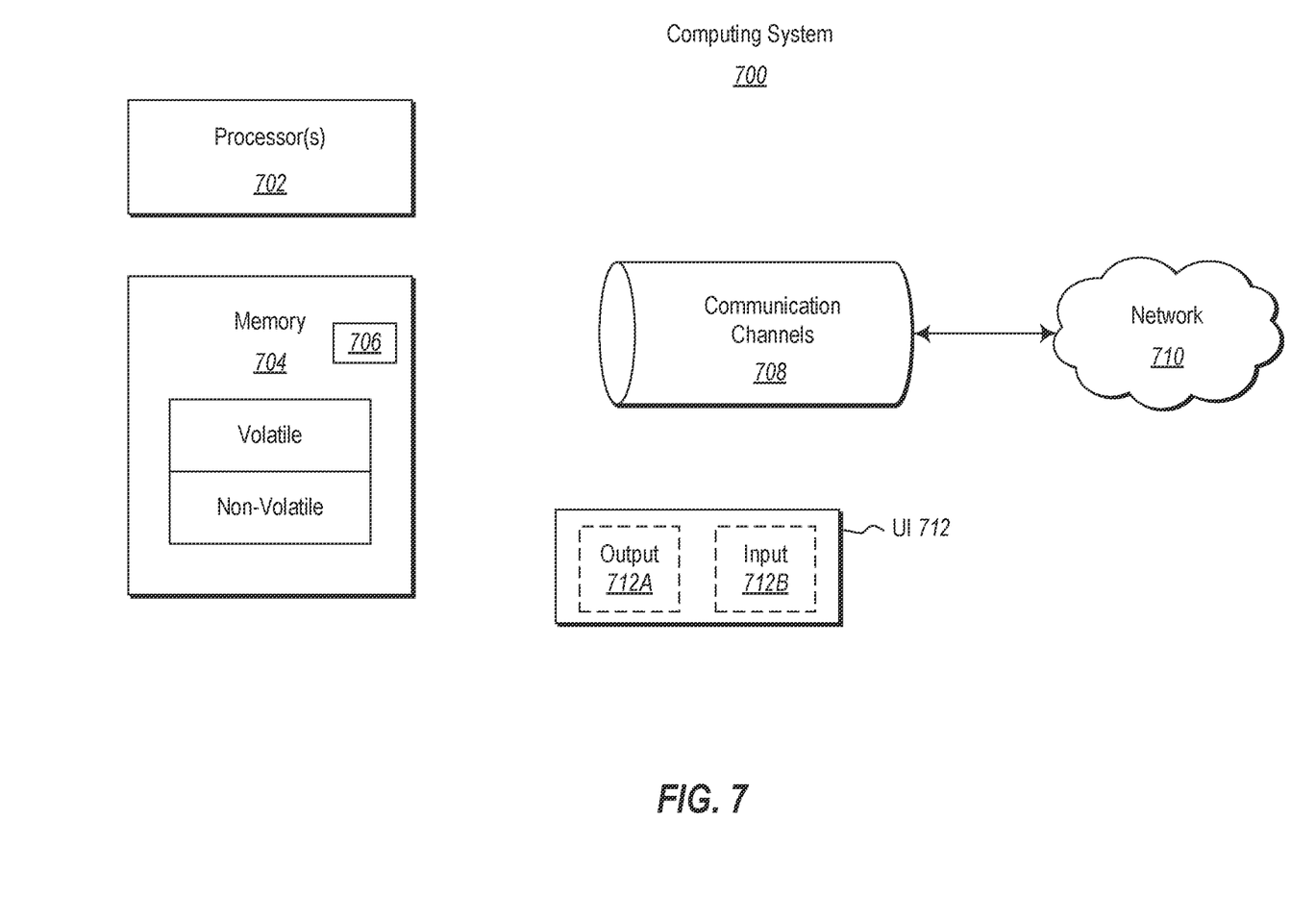
FIG. 7 illustrates an example computing system in which the principles described herein may be employed.

As illustrated in FIG. 7, in its most basic configuration, a computing system 700 includes at least one hardware processing unit 702 and memory 704. The processing unit 702 includes a general-purpose processor. Although not required, the processing unit 702 may also include a field programmable gate array (FPGA), an application specific integrated circuit (ASIC), or any other specialized circuit. In one embodiment, the memory 704 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 700 also has thereon multiple structures often referred to as an "executable component". For instance, the memory 704 of the computing system 700 is illustrated as including executable component 706. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description and in the case, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 704 of the computing system 700. Computing system 700 may also contain communication channels 708 that allow the computing system 700 to communicate with other computing systems over, for example, network 710.

While not all computing systems require a user interface, in some embodiments, the computing system 700 includes a user interface system 712 for use in interfacing with a user. The user interface system 712 may include output mechanisms 712A as well as input mechanisms 712B. The principles described herein are not limited to the precise output mechanisms 712A or input mechanisms 712B as such will depend on the nature of the device. However, output mechanisms 712A might include, for instance, speakers, displays, tactile output, virtual or augmented reality, holograms and so forth. Examples of input mechanisms 712B might include, for instance, microphones, touchscreens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A computing system that generates a natural language explanation of what generated code does, said computing system comprising:
   one or more processors; and
   one or more computer-readable media having thereon computer-executable instructions that are executable by the one or more processors to cause the computing system to:
   access code that is structured to cause performance of a task, wherein the code is associated with an action token that represents an action performed by the code;
   determine that the code uses a feature that is not supported in a task representation token library;
   generate a task-centric representation of the code, the task-centric representation including a task representation of the task, wherein, as a result of the code using the feature that is not supported in the task representation token library, the task representation uses multiple components to represent the task defined by the code, such that a one-to-multiple mapping is generated between the task and the task representation;
   generate a natural language description for the task representation, wherein the natural language description semantically describes, in natural language, the task represented by the task representation, and wherein the natural language description is generated from the action token and is based on the one-to-multiple mapping between the task and the task representation;
   display the natural language description in a user interface, wherein the natural language description includes a first portion that is displayed in a first user interface editing control and a second portion that is displayed in a second user interface editing control, wherein the first and second user interface editing controls are displayed in an order within the user interface, where said order is representative of an execution sequence for the code associated with the natural language description, and wherein the first and second user interface editing controls allow one or more edits to be made to the natural language description;
   edit the natural language description, resulting in generation of an edited natural language description and further resulting in a modified execution sequence for the code associated with the natural language description, wherein editing the natural language description is performed by:
      receiving a user selection of the second user interface editing control within the user interface; and
      reordering the first and second user interface editing controls within the user interface by dragging the second user interface editing control, which has been selected via the user selection, to a new ordering position relative to the first user interface editing control, wherein said reordering results in a modification being made to a visual layout of the user interface and further results in the modified execution sequence for the natural language description;
   after said reordering, cause regeneration of an executable portion of the code based on the edited natural language description and based on the modified execution sequence.

2. The computing system in accordance with claim 1, the code being computer-generated using a language model in response to the language model being fed model input that represents user intent.

3. The computing system in accordance with claim 2, the instructions being further executable to cause the computing system to:
   formulate model input that includes a representation of the user intent; and
   cause the model input to be fed to the language model causing the language model to generate the code.

4. The computing system in accordance with claim 2, the model input also including non-natural language data.

5. The computing system in accordance with claim 2, the user intent derived from a prompt entered by a user in a spreadsheet program, the non-natural language data being a representation of at least a portion of a spreadsheet table of the spreadsheet program.

6. The computing system in accordance with claim 1, the allowed user-editing of the natural language description comprising deleting or editing the natural language description.

7. The computing system in accordance with claim 1, the computer-executable instructions being further executable by the one or more processors to cause the computing system to:
   render an additional control that allows a user to add a second natural language description, wherein the regeneration is in response to the additional control being interacted with to add the second natural language description.

8. The computing system in accordance with claim 1, wherein the regeneration is performed by:
   editing the code to reflect edits in the natural language description.

9. The computing system in accordance with claim 1, wherein the regeneration is performed by:
   using program synthesis to regenerate the code.

10. The computing system in accordance with claim 1, wherein the regeneration is performed by:
   causing the edited natural language description to be fed to a language model.

11. The computing system in accordance with claim 1, the code being previous code that is computer-generated using a language model in response to the language model being fed first model input that includes a natural language portion and a non-natural language portion, wherein the computer-executable instructions are further executable by the one or more processors to cause the computing system to:
formulate a second model input that includes a natural language portion in a form of the natural language description as edited by a user; and
feed the second model input to the language model.

12. The computing system in accordance with claim 11, the second model input also including the non-natural language portion that was included within the first model input.

13. The computing system in accordance with claim 11, the language model being a same language model that was used to previously generate the code prior to editing of the natural language description.

14. A computing system that generates a natural language explanation of what generated code does, said computing system comprising:
one or more processors; and
one or more computer-readable media having thereon computer-executable instructions that are executable by the one or more processors to cause the computing system to:
formulate model input that includes a natural language portion that represents a natural language input by a user and that also includes a non-natural language portion representing data that is to be interpreted using the natural language input entered by the user;
cause the model input to be fed to a language model, resulting in the language model generating code, the code being structured to cause performance of a task, wherein the code is associated with an action token that represents an action performed by the code;
determine that the code uses a feature that is not supported in a task representation token library;
generate a task-centric representation of the code, the task-centric representation including a task representation of the task, wherein, as a result of the code using the feature that is not supported in the task representation token library, the task representation uses multiple components to represent the task defined by the code, such that a one-to-multiple mapping is generated between the task and the task representation;
generate a natural language description for the task representation, wherein the natural language description semantically describes, in natural language, the task represented by the task representation, and wherein the natural language description is generated from the action token and is based on the one-to-multiple mapping between the task and the task representation;
display the natural language description in a user interface, wherein the natural language description includes a first portion that is displayed in a first user interface editing control and a second portion that is displayed in a second user interface editing control, wherein the first and second user interface editing controls are displayed in an order within the user interface, where said order is representative of an execution sequence for the code associated with the natural language description, and wherein the first and second user interface editing controls allow one or more edits to be made to the natural language description;
edit the natural language description, resulting in generation of an edited natural language description and further resulting in a modified execution sequence for the code associated with the natural language description, wherein editing the natural language description is performed by:
receiving a user selection of the second user interface editing control within the user interface; and
reordering the first and second user interface editing controls within the user interface by dragging the second user interface editing control, which has been selected via the user selection, to a new ordering position relative to the first user interface editing control, wherein said reordering results in a modification being made to a visual layout of the user interface and further results in the modified execution sequence for the natural language description;
after said reordering, cause regeneration of an executable portion of the code based on the edited natural language description and based on the modified execution sequence.

15. The computing system in accordance with claim 14, the allowed user-editing of the natural language description comprising deleting or editing the natural language description.

16. The computing system in accordance with claim 14, wherein the regeneration is performed by:
editing the code to reflect changes in the natural language description.

17. The computing system in accordance with claim 14, wherein the regeneration is performed by:
using program synthesis to regenerate the code.

18. The computing system in accordance with claim 14, the regeneration control structured to initiate regeneration of the code by:
causing the edited natural language description to be fed to the language model to regenerate the code.

19. The computing system in accordance with claim 14, the code being previous code that is computer-generated using a language model in response to the language model being fed first model input that includes a natural language portion and a non-natural language portion, wherein the computer-executable instructions are further executable by the one or more processors to cause the computing system to:
formulate a second model input that includes a natural language portion as edited by the user; and
feed the second model input to the language model to regenerate the code.

20. A method, performed by a computing system, to generate a natural language explanation of what generated code does, the method comprising:
accessing code that is structured to cause performance of a task, wherein the code is associated with an action token that represents an action performed by the code;
determining that the code uses a feature that is not supported in a task representation token library;
generating a task-centric representation of the code, the task-centric representation including a task representation of the task, wherein, as a result of the code using the feature that is not supported in the task representation token library, the task representation uses multiple components to represent the task defined by the code, such that a one-to-multiple mapping is generated between the task and the task representation;

generating a natural language description for the task representation, wherein the natural language description semantically describes, in natural language, the task represented by the task representation, and wherein the natural language description is generated from the action token and is based on the one-to-multiple mapping between the task and the task representation;

displaying the natural language description in a user interface, wherein the natural language description includes a first portion that is displayed in a first user interface editing control and a second portion that is displayed in a second user interface editing control, wherein the first and second user interface editing controls are displayed in an order within the user interface, where said order is representative of an execution sequence for the code associated with the natural language description, and wherein the first and second user interface editing controls allow one or more edits to be made to the natural language description;

editing the natural language description, resulting in generation an edited natural language description and further resulting in a modified execution sequence for the code associated with the natural language description, wherein editing the natural language description is performed by:

receiving a user selection of the second user interface editing control within the user interface; and reordering the first and second user interface editing controls within the user interface by dragging the second user interface editing control, which has been selected via the user selection, to a new ordering position relative to the first user interface editing control, wherein said reordering results in a modification being made to a visual layout of the user interface and further results in the modified execution sequence for the natural language description;

after said reordering, causing regeneration of an executable portion of the code based on the edited natural language description and based on the modified execution sequence.

\* \* \* \* \*